UNITED STATES PATENT OFFICE.

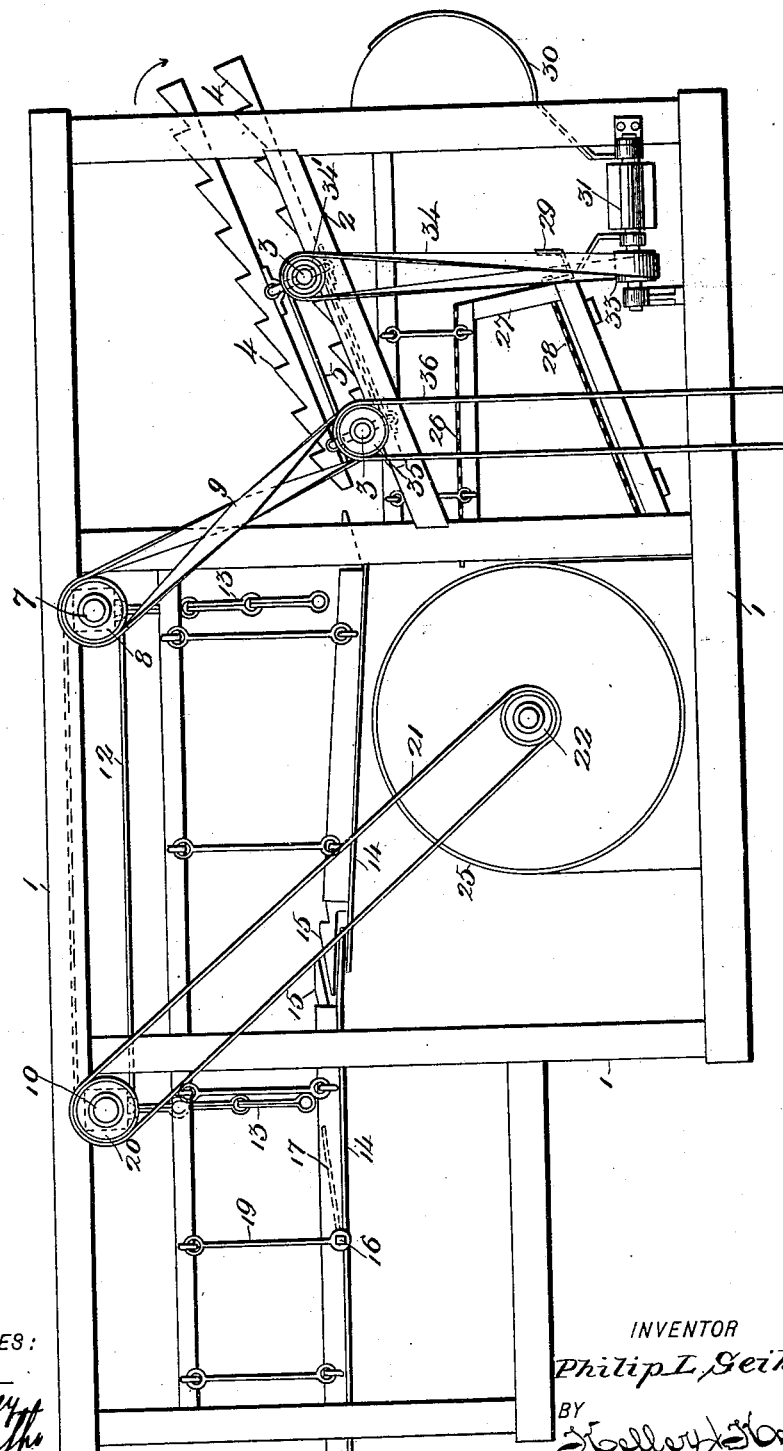

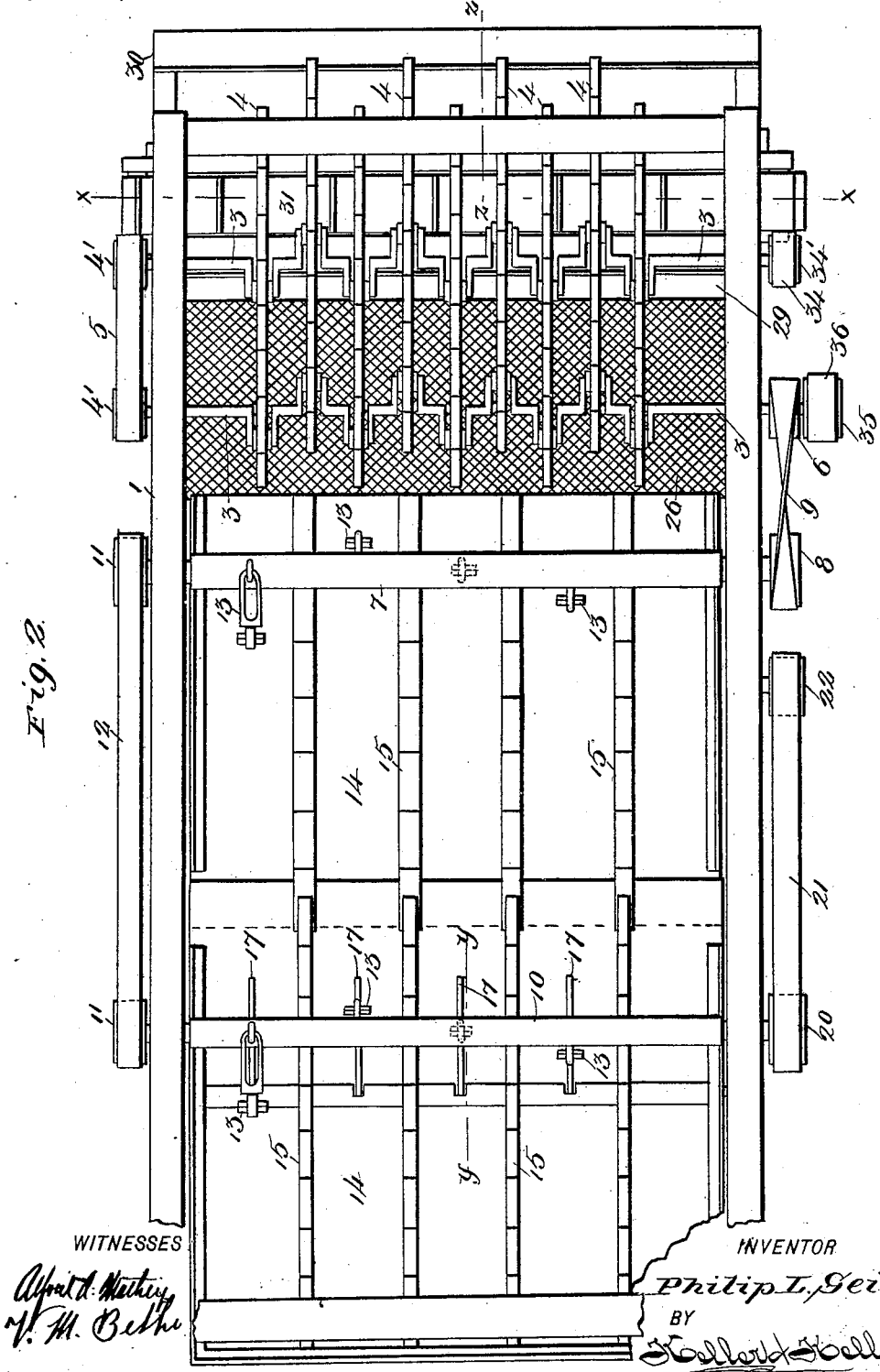

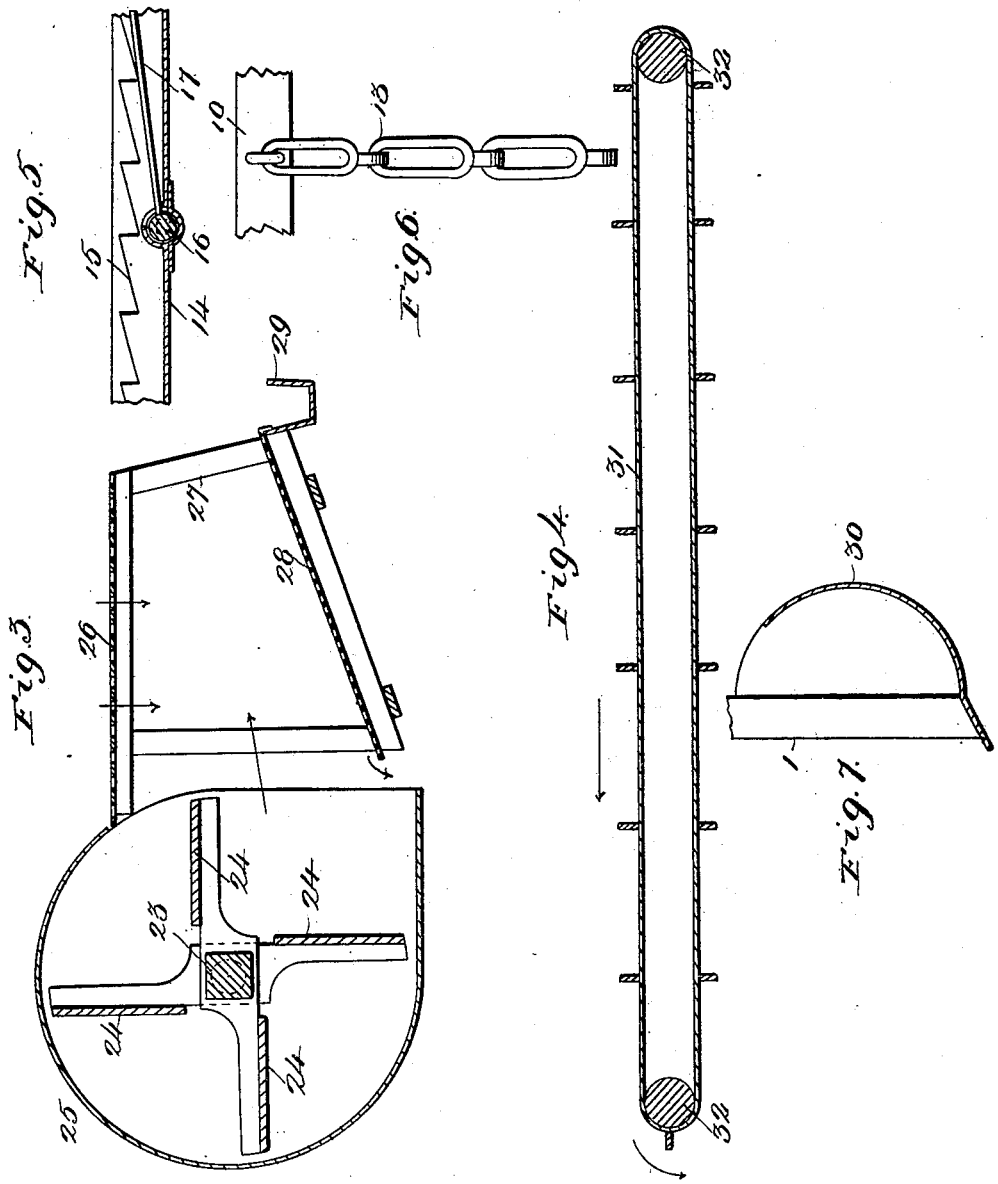

PHILIP L. SEIB, OF MILLSTADT, ILLINOIS.

THRESHING AND SEPARATING MACHINE.

SPECIFICATION forming part of Letters Patent No. 631,826, dated August 29, 1899.

Application filed December 22, 1898. Serial No. 700,046. (No model.)

*To all whom it may concern:*

Be it known that I, PHILIP L. SEIB, a citizen of the United States, residing at Millstadt, in the county of St. Clair and State of Illinois, have invented certain new and useful Improvements in Threshing and Separating Machines; and I do hereby declare the following to be a full, clear, and exact description of the invention, such as will enable others skilled in the art to which it appertains to make and use the same.

My invention relates to improvements in threshing and separating machines; and it consists in the novel combination and arrangement of parts, as will be hereinafter more particularly described and claimed.

In the drawings, Figure 1 is a side elevation of my complete invention. Fig. 2 is a top plan view of the same. Fig. 3 is a vertical section of the fan and screens. Fig. 4 is a longitudinal section of the endless conveyer, taken on the line $x\ x$ of Fig. 2. Fig. 5 is a detail sectional view of one of the shakers, taken on the line $y\ y$ of Fig. 2. Fig. 6 is a detail view of a portion of one of the beaters; and Fig. 7 is a detail sectional view of the guard, taken on the line $z\ z$ of Fig. 2.

The object of my invention is to construct a combined threshing and separating machine in such a manner that the straw, grain, and chaff are thoroughly separated from one another, the straw being delivered at one end of the machine, or that end opposite to the feeding end of the same, the chaff conveyed to one side of said machine, where it may be conveyed to any suitable position, and the grain pass through the machine and deposited from the bottom of the same, all of which will be evident from the detail description to follow.

Referring to the drawings, 1 represents the frame of the machine, which may be of any suitable design, and 2 inclined transverse beams which are provided with bearings for receiving the opposite ends of the two crank-shafts 3 3, which coöperate with and operate the tooth-bars 4 for elevating and feeding the straw to the delivery end of the machine.

Fixed to the projecting ends of the crank-shafts 3, on one side of the machine, are two belt-pulleys 4' 4', over which an endless belt 5 is passed, whereby said crank-shafts are operated simultaneously in the same direction, whereby the tooth-bars 4 are not only raised and lowered, but moved backward and forward, causing the straw after the grain has been separated therefrom to be carried in the direction previously described. Fixed to the opposite ends of the shaft 3 is a belt-pulley 6, and also fixed to the projecting end of the shaft 7, forming one of the beaters, is a like pulley 8, over which pulleys an endless cross-belt 9 passes, whereby motion is imparted to the said shaft 7 in the proper direction, the corresponding shaft 10, which forms the other beater, being also operated in the same direction by belt-pulleys 11, fixed to the opposite projecting ends of the beater-shafts, over which pulleys an endless belt 12 passes, whereby said beaters are not only turned in the same direction, but simultaneously.

The beater-shafts 7 and 10 are preferably rectangular in cross-section, and loosely secured to the four sides of the same along their length are a series of links 13, which may be of any suitable design, which when rotated will yieldingly strike the straw, together with its grain, whereby grain is removed from the straw and deposited upon the shakers 14, which are of the usual construction. The swinging shakers 14 are reciprocated back and forth and to and from one another by the usual mechanism employed for this purpose and which is not shown in the present application.

The upper surfaces of the shakers 14 are each provided with tooth-bars 15, upon which the straw, together with its grain, rests and which operate to prevent said straw from accidentally being fed out of the receiving end of the machine, the rear shaker of which is provided with a transverse shaft 16, which is journaled to the bottom of said shaker and from which project a series of arms 17, the ends of which point toward the delivery end of the machine, the said arms passing loosely through openings 18, formed for their reception in the bottom of said shaker. The opposite ends of said shaft are fixed to the depending ends of the swinging arms or links 19, whereby when the shaker is moved in a forward direction the said arms 17, or, more properly, the free ends of the same, are elevated and further operate to feed the straw in a forward direction and further prevent the straw from passing out of the receiving end of the machine.

To the opposite ends of the beater-shaft 10 is secured a belt-pulley 20, over which an endless belt 21 passes, said belt also passing over a belt-pulley 22, fixed to the projecting end of the fan-shaft 23, to which shaft is fixed any number of blades 24, incased by casing 25, by means of which a sufficient amount of air is forced upon the grain as it drops to separate the chaff therefrom.

The grain after being separated from the straw by the beaters and delivered upon the shakers falls and is deposited, together with the chaff, through the perforated screen 26, carried by the frame 27, where it is struck by the air, the chaff removed therefrom, and the grain allowed to drop upon the lower fine screen 28, which is arranged at an incline and is designed to direct the same to the bottom of the machine.

Secured to the frame 27, adjacent to the upper end of the screen 28, is a trough 29, which operates to receive the grain that is carried over the conveyer 31 by the wind from the fan, from which trough the said grain may be removed at any convenient time.

Secured to the delivery end of the machine is a curved shield 30, which operates to prevent the chaff from being blown out of the delivery end of the machine, and further directs the chaff to the endless conveyer 31, which is arranged transversely across the machine and below the trough 29, where said chaff can be further directed or deposited to any suitable position by another conveyer (not shown) to any position remote from the machine.

To the opposite sides of the machine are journaled two rollers 32, over which the endless belt or conveyer 31 passes, and projecting from one end of one of the rollers is a belt-wheel 33, over which an endless belt 34 passes and over a similar belt-pulley 34', fixed to the projecting end of the upper crank-shaft 3, whereby motion is imparted to the endless conveyer 31.

I do not limit myself to the particular arrangement and operation of certain parts of the machine, as the same may be varied without departing from the nature of my invention, especially the beaters, the inclined tooth-bars for delivering the straw from that end of the machine, and the endless conveyer, the other parts of which being well known and employed in other threshing-machines.

By the construction of the tooth-bars 4 and the crank-shafts 3, to which the same are movably connected, it will be seen that as one set of bars are being moved toward the feeding end of the machine the same are in their lowest position and out of contact with the straw, while the others are elevated and are moved forward, whereby the straw is continuously and uniformly conveyed to the delivery end of the machine, where it is dropped, as before stated.

Secured to the projecting end of the lower crank-shaft 3, adjacent to the belt-pulley 6, is a second belt-pulley 35, over which a power-belt 36 passes for imparting motion to the various parts comprising the machine.

Having fully described my invention, what I claim is—

A threshing and separating machine, comprising a suitable shaker, a frame 27, located at the delivery end of the latter, and below the same, a perforated screen 26, secured to said frame, a lower fine screen 28, also secured to the said frame and arranged at an incline, a fan located below the shaker, and adapted to force air between said screens, a trough 29, carried by the frame, adjacent to the upper end of the screen 28, for receiving the grain that is carried by the air, a curved shield 30, secured to the delivery end of the machine, and running the full width of the same, an endless conveyer arranged transversely across the machine, and below said trough, and a suitable straw-carrier, coöperating with the delivery end of the shaker, whereby the chaff is deposited upon the transverse conveyer, and adapted to be delivered to one side of the machine, as and for the purpose described.

In testimony whereof I affix my signature in presence of two witnesses.

PHILIP L. SEIB.

Witnesses:
ALFRED A. MATHEY,
C. F. KELLER.